(12) United States Patent
Stranz et al.

(10) Patent No.: US 8,939,743 B2
(45) Date of Patent: Jan. 27, 2015

(54) DEVICE FOR SUPPLYING A FLUID FOR EXPLOSION FORMING

(75) Inventors: Andreas Stranz, Reichenau (AT); Alexander Zak, Moedling (AT)

(73) Assignee: Cosma Engineering Europe AG, Oberwaltersdorf (AT)

( * ) Notice: Subject to any disclaimer, the term of this patent is extended or adjusted under 35 U.S.C. 154(b) by 473 days.

(21) Appl. No.: 12/671,789

(22) PCT Filed: Jun. 2, 2008

(86) PCT No.: PCT/EP2008/004375
§ 371 (c)(1),
(2), (4) Date: Feb. 2, 2010

(87) PCT Pub. No.: WO2009/015716
PCT Pub. Date: Feb. 5, 2009

(65) Prior Publication Data
US 2011/0180735 A1 Jul. 28, 2011

(30) Foreign Application Priority Data
Aug. 2, 2007 (DE) .......................... 10 2007 036 196

(51) Int. Cl.
*B21D 26/08* (2006.01)
*F16K 31/06* (2006.01)
(52) U.S. Cl.
CPC ............ *B21D 26/08* (2013.01); *F16K 31/0655* (2013.01); *Y10S 72/706* (2013.01)
USPC ................ 425/1; 251/77; 251/63.4; 251/291; 137/454.6; 72/706; 264/84
(58) Field of Classification Search
CPC B29C 2049/4647; B29C 49/46; B21D 26/08; B22C 15/23

USPC ............... 137/625.33, 625.34, 625.37, 454.6; 251/77, 63.4, 291; 29/421.2; 72/706; 264/84; 425/1
See application file for complete search history.

(56) References Cited

U.S. PATENT DOCUMENTS

| 51,037 | A | * | 11/1865 | Gardner et al. .......... 137/625.34 |
| 1,406,026 | A | * | 2/1922 | Jensenius ...................... 137/494 |
| 392,635 | A | | 5/1933 | Powers |

(Continued)

FOREIGN PATENT DOCUMENTS

| AT | 248838 | 8/1966 |
| AT | 276032 | 11/1969 |

(Continued)

OTHER PUBLICATIONS

Society of Manufacturing Engineers, Explosive Metal Working Options, Die Design Handbook, 1190, p. 8-10, Third Edition, 1990, Dearborn, Michigan.

*Primary Examiner* — Eric Keasel
(74) *Attorney, Agent, or Firm* — Dickinson Wright PLLC

(57) ABSTRACT

With the invention, a device for fluid feed for explosive forming, which has a valve and an activating mechanism to activate the valve, is to be improved, so that the device permits both good filling of a die with fluid and good sealing during the explosive forming process in a technically simple design. This task is solved by a device for fluid feed for explosive forming that has a valve and an activating mechanism to activate the valve, in which the activating mechanism is arranged separate from the valve in an inactivated valve state.

27 Claims, 6 Drawing Sheets

(56) References Cited

U.S. PATENT DOCUMENTS

| | | | |
|---|---|---|---|
| 2,325,725 A * | 8/1943 | Wood | 137/38 |
| 2,503,563 A * | 4/1950 | Ray | 251/128 |
| 2,536,921 A * | 1/1951 | Duke | 137/625.33 |
| 2,634,748 A * | 4/1953 | Morrison | 137/523 |
| 2,653,626 A * | 9/1953 | Finlayson | 137/599.18 |
| 3,114,387 A * | 12/1963 | Barkan et al. | 137/494 |
| 3,160,949 A | 12/1964 | Bussey et al. | |
| 3,162,087 A | 12/1964 | Lakes | |
| 3,233,291 A * | 2/1966 | Miller et al. | 264/84 |
| 3,236,080 A * | 2/1966 | Illgen | 72/56 |
| 3,252,312 A | 5/1966 | Maier | |
| 3,342,048 A | 9/1967 | Johnson et al. | |
| 3,600,921 A | 8/1971 | Schwarz | |
| 3,640,110 A | 2/1972 | Inoue | |
| 3,654,788 A | 4/1972 | Kimura | |
| 3,661,004 A | 5/1972 | Lee et al. | |
| 1,280,451 A | 7/1972 | Hagen | |
| 3,677,048 A * | 7/1972 | Fuchs, Jr. | 72/60 |
| 3,737,975 A | 6/1973 | McKinnon, Jr. | |
| 3,742,746 A | 7/1973 | Erlandson | |
| 4,142,707 A * | 3/1979 | Bjorklund | 251/77 |
| 4,187,709 A | 2/1980 | Legate et al. | |
| 4,214,727 A * | 7/1980 | Baram | 251/63.4 |
| 4,224,959 A * | 9/1980 | Fling | 137/343 |
| 4,373,588 A * | 2/1983 | White et al. | 169/19 |
| 4,471,640 A | 9/1984 | Kortenski et al. | |
| 4,492,104 A | 1/1985 | Weaver et al. | |
| 4,494,392 A | 1/1985 | Schroeder | |
| 4,571,800 A | 2/1986 | Faupell | |
| 4,593,882 A * | 6/1986 | West | 251/243 |
| 4,597,557 A * | 7/1986 | Krieger et al. | 251/63.4 |
| 4,738,012 A | 4/1988 | Hughes et al. | |
| 4,753,213 A * | 6/1988 | Schlunke et al. | 123/533 |
| 4,788,841 A | 12/1988 | Calhoun et al. | |
| 4,836,241 A * | 6/1989 | Schoenwald | 137/494 |
| 4,856,311 A | 8/1989 | Conaway | |
| 4,905,730 A * | 3/1990 | Stoll | 137/543.21 |
| 4,969,482 A * | 11/1990 | Perrin et al. | 137/76 |
| 5,187,962 A | 2/1993 | Bilko et al. | |
| 5,220,727 A | 6/1993 | Hochstein | |
| 5,282,577 A * | 2/1994 | Neitz | 239/533.4 |
| 5,339,666 A | 8/1994 | Suzuki et al. | |
| 5,377,594 A | 1/1995 | Alford | |
| 5,423,348 A * | 6/1995 | Jezek et al. | 137/454.6 |
| 5,787,917 A * | 8/1998 | Park et al. | 137/38 |
| 5,890,698 A | 4/1999 | Domytrak | |
| 6,299,130 B1 * | 10/2001 | Yew et al. | 251/129.15 |
| 6,315,939 B1 * | 11/2001 | Mock et al. | 264/454 |
| 6,669,167 B2 * | 12/2003 | Lin | 251/144 |
| 7,762,274 B2 * | 7/2010 | Wong | 137/219 |
| 2001/0054442 A1 * | 12/2001 | Voss | 137/522 |
| 2006/0042701 A1 * | 3/2006 | Jansen | 137/606 |
| 2006/0060601 A1 | 3/2006 | Kubacki et al. | |

FOREIGN PATENT DOCUMENTS

| | | |
|---|---|---|
| AT | 371384 | 6/1983 |
| CH | 409831 | 10/1966 |
| DE | 1452667 U | 12/1938 |
| DE | 1218986 | 1/1967 |
| DE | 1235246 B1 | 3/1967 |
| DE | 1129562 | 10/1968 |
| DE | 1452665 A1 | 5/1969 |
| DE | 1452667 A1 | 5/1969 |
| DE | 1527949 A1 | 11/1969 |
| DE | 1801784 A1 | 6/1970 |
| DE | 1808942 A1 | 6/1970 |
| DE | 2043251 | 9/1970 |
| DE | 1777207 A1 | 4/1971 |
| DE | 1777208 A1 | 4/1971 |
| DE | 2043251 | 3/1972 |
| DE | 2059181 A1 | 6/1972 |
| DE | 2107460 A1 | 8/1972 |
| DE | 2357295 A1 | 5/1974 |
| DE | 2337176 A1 | 6/1975 |
| DE | 114231 | 7/1975 |
| DE | 2622317 A1 | 1/1977 |
| DE | 2628579 A1 | 12/1977 |
| DE | 2908561 A1 | 10/1979 |
| DE | 158364 | 12/1983 |
| DE | 3341488 A1 | 5/1984 |
| DE | 3305615 A1 | 8/1984 |
| DE | 217154 A1 | 1/1985 |
| DE | 3590248 C2 | 6/1986 |
| DE | 3512015 A1 | 10/1986 |
| DE | 260450 A1 | 9/1988 |
| DE | 3709181 A1 | 9/1988 |
| DE | 4035894 C1 | 1/1992 |
| DE | 4232913 C2 | 4/1994 |
| DE | 19536292 | 4/1997 |
| DE | 19638679 A1 | 3/1998 |
| DE | 19638688 A1 | 3/1998 |
| DE | 19709918 A1 | 9/1998 |
| DE | 19818572 C1 | 11/1999 |
| DE | 19852302 A1 | 5/2000 |
| DE | 19915383 B4 | 10/2000 |
| DE | 19957836 A1 | 6/2001 |
| DE | 10328154 A1 | 12/2004 |
| DE | 102005025660 A1 | 12/2006 |
| DE | 102006056788 | 12/2006 |
| DE | 102007007330 | 2/2007 |
| DE | 102007023669 | 5/2007 |
| DE | 102006008533 A1 | 8/2007 |
| DE | 102007036196 | 8/2007 |
| DE | 102006019856 A1 | 11/2007 |
| DE | 102006037754 B3 | 1/2008 |
| DE | 102008006979 | 1/2008 |
| DE | 102006037742 A1 | 2/2008 |
| DE | 102006060372 A1 | 6/2008 |
| EP | 0151490 A2 | 8/1985 |
| EP | 148459 B1 | 11/1987 |
| EP | 0288705 A2 | 11/1988 |
| EP | 00371018 B1 | 7/1992 |
| EP | 0592068 A1 | 4/1994 |
| EP | 0590262 B1 | 4/1996 |
| EP | 0765675 A2 | 4/1997 |
| EP | 0830906 A1 | 3/1998 |
| EP | 0830907 A2 | 3/1998 |
| EP | 1702695 A2 | 9/2006 |
| EP | 1849551 A2 | 10/2007 |
| FR | 1342377 A | 9/1963 |
| FR | 2300322 A1 | 2/1975 |
| FR | 2280465 | 2/1976 |
| FR | 7503396 | 9/1976 |
| GB | 742460 | 6/1952 |
| GB | 878178 A | 9/1961 |
| GB | 1129562 A | 10/1968 |
| GB | 1280451 A | 7/1972 |
| GB | 1419889 | 12/1975 |
| GB | 1436538 | 5/1976 |
| GB | 1501049 A | 2/1978 |
| GB | 1542519 A | 3/1979 |
| GB | 2009651 A | 6/1979 |
| GB | 2047147 A | 11/1980 |
| JP | 55-139128 A | 10/1980 |
| JP | 58145381 A | 8/1983 |
| JP | 2117728 A | 5/1990 |
| JP | 739958 | 2/1995 |
| JP | 70505176 | 2/1995 |
| JP | 2001054866 A | 2/2001 |
| JP | 2002093379 A | 3/2002 |
| JP | 2007-222778 A | 9/2007 |
| WO | 9508410 A | 3/1995 |
| WO | 9933590 A2 | 7/1999 |
| WO | 0000309 A1 | 1/2000 |
| WO | 2004028719 A1 | 4/2004 |
| WO | 2006128519 A | 12/2006 |
| WO | 2008098608 A1 | 8/2008 |
| WO | 2009095042 A1 | 8/2009 |

* cited by examiner

DEVICE FOR SUPPLYING A FLUID FOR EXPLOSION FORMING

CROSS-REFERENCE TO RELATED APPLICATIONS

This application is a National Entry Application of PCT/EP08/004375, filed Jun. 2, 2008, which claims priority from German Patent Application Serial No. 102007036196.5, filed on Aug. 2, 2007, entitled " Vorrichtung für die Zufuhr eines Fluids für Explosionsumformen" (Device For Supplying A Fluid For Explosion Forming), the disclosure of which is incorporated herein by reference for all purposes.

FIELD OF THE INVENTION

The invention concerns a device for fluid feed for explosive forming with the features of the preamble of claim 1.

BACKGROUND OF THE INVENTION

Such devices generally include a valve, via which admission of an explosive gas into an element of the explosive forming die that accommodates the valve is controlled. By igniting the explosive gas in the explosive forming die, a detonation front is formed that propagates along the die. In this process, large forces act on the valve, which again impose high requirements on the tightness of the valve.

SUMMARY OF THE INVENTION

The underlying task of the invention is to improve a device of the above-mentioned generic type, so that the device, with a technically simple design, permits both good filling of the die with fluid and good sealing during the explosive forming process and, nevertheless, is largely protected from the direct effects of the detonation.

This task is solved according to the invention with a device with the features of claim 1.

By extensive mechanical decoupling of the activating mechanism from the valve, the weight of a movable valve element, such as a valve tappet, can be kept small. It has been shown that this causes an advantageous behavior, as well as good leak tightness of the valve, during the explosion process. Despite the dynamic loading that occurs on the valve during the explosion, good sealing can be achieved. By extensive decoupling of the valve from the activating mechanism, this is simultaneously protected from the forces acting during the explosion.

In an advantageous embodiment of the invention, the activating mechanism can be spaced from the valve in the unoperated valve state. This guarantees a mechanical decoupling of the activating mechanism from the valve.

Advantageously, the distance between the activating mechanism and the valve can be 2 to 7 mm, preferably 3 to 6 mm, and more preferably 4 to 5 mm. It has been shown that this spacing range is advantageous in practice and guarantees good decoupling.

In one variant of the invention, the activating mechanism can be arranged in series after the valve. This advantageous arrangement guarantees good force transfer from the activating mechanism to the valve.

In an advantageous embodiment of the invention, the activating mechanism can be held in a rest position by an elastic element, in which the valve is in the inactivated state. This permits an automatic closure of the valve.

In an advantageous variant of the invention, the activating mechanism can be brought into a working position by pressurization with a fluid, in which the valve is in an activated state. Through pressurization with a fluid, for example, by means of hydraulics or pneumatics, large activating forces can be achieved.

In a further embodiment of the invention, the activating mechanism can be brought into a working position by electric power, in which the valve is in an activated state. A very broad application range is achieved on this account.

The valve can advantageously have a pressure chamber fillable with fluid with at least two fluid connections. The pressure chamber can be rapidly filled on this account. The cycle times for an explosive forming process can thus be reduced. In any event, different gases can also be filled via the connections, so that a fluid mixture is formed in the pressure chamber. The different gases can be properly metered via the separate connections. This is an advantage, in particular, during use of oxyhydrogen gas.

In an advantageous embodiment of the invention, the pressure chamber can have an additional connection, via which a fluid and/or measuring instrument, especially a pressure measuring instrument, can be introduced to the pressure chamber. The processes in the pressure chamber can thus be monitored and the safety of the valve can be increased.

A valve housing of the valve, in particular, can be multipart. This permits a modular design and therefore a flexible production of the valve.

In a further embodiment of the invention, a valve seat, provided in a valve housing, can be provided in a separate segment of the valve housing. This permits adjustment of the housing segment containing the valve seat to the particular thermal and mechanical requirements in this area.

In one variant of the invention, a valve element can be at least partially surrounded by the fluid during the fluid feed. The fluid can thus propagate along the valve element. This guarantees a good fluid feed.

Advantageously, a valve element can have longitudinal grooves that extend from the pressure chamber in the direction of a valve head of the valve element. The longitudinal grooves are technically simple to produce and guarantee a good control, as well as feed of fluid to the valve head.

Furthermore, a valve housing can also have longitudinal grooves that extend from the pressure chamber in the direction of a valve head of the valve element. This allows for a well directed control of the fluid with technically simple means.

In a further embodiment of the invention, a valve head of a valve element can have a conical sealing surface and an approximately cylindrical area on the outflow side and a correspondingly shaped valve seat can be provided. It has been found that this particular form of the valve has good sealing properties, especially at the high forces and pressures occurring during explosive forming.

Advantageously, a valve element can have a middle piece, having a valve head, and an edge area, in which the axial position of the middle piece relative to the edge area can be adjusted by adjustment means. The axial position, and therefore the closure position of the valve head, can therefore be properly adjusted.

Alternatively, the valve element can be designed integrally, i.e. in one piece. This increases the stability of the valve element and simplifies its production.

In one variant of the invention, the valve element can have a shoulder that is moveable in a movement space in the valve housing that limits the axial movement of the valve element.

The movement possibility of the valve element is thus limited with technically simple means and the safety of the valve increased.

Furthermore, the valve element can be displaceable by means of an elastic element into a position in which the valve is situated in the inactivated state. This permits an automatic closure of the valve.

Advantageously, a seal made of a low-sparking material can be provided between the valve and an element of the explosive forming die that accommodates the valve. It has been found that a low-sparking material guarantees good sealing properties, especially with the requirements occurring during explosive forming.

In an advantageous variant of the invention, a valve element can have a low-sparking material. This guarantees good sealing properties in the valve seat.

BRIEF DESCRIPTION OF THE DRAWINGS

Two embodiments of the invention are described below with reference to the following drawing. In the drawing.

DETAILED DESCRIPTION OF THE PREFERRED EMBODIMENTS

Figure 1:
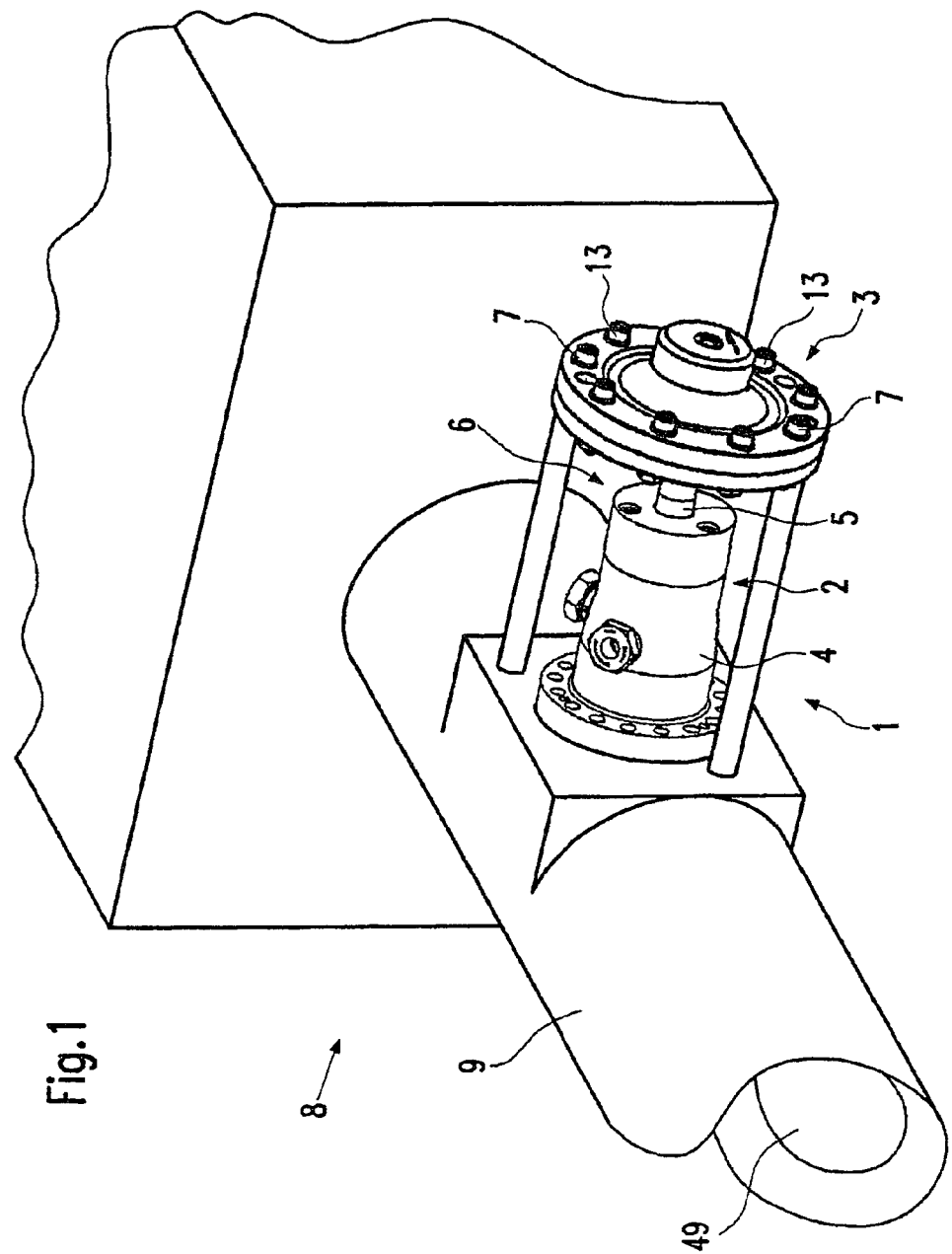
FIG. 1 shows a perspective view of a first embodiment of a device according to the invention mounted on an explosive forming die.

FIG. 1 shows a perspective view of an embodiment of the device 1 according to the invention to supply fluid for explosive forming in a state mounted on an explosive forming die 8.

The device 1 in FIG. 1 is mounted on an ignition tube 9 of the explosive forming die 8 by means of screws 7. The ignition tube 9 has an ignition chamber 49 in its interior, which can be filled with a fluid via the device 1. In other embodiments of the invention, the device can also be mounted at any other location of the explosive forming die 8 suitable for filling with a fluid.

The device 1 has a valve 2 and an activating mechanism 3. The valve 2 has a valve element movable in a valve housing 4, in this case a valve tappet 5, which extends in the valve housing 4 and protrudes from the rear end 6 of valve housing 4.

The activating mechanism 3 is arranged in an extension of valve 2 behind it.

Figure 2:
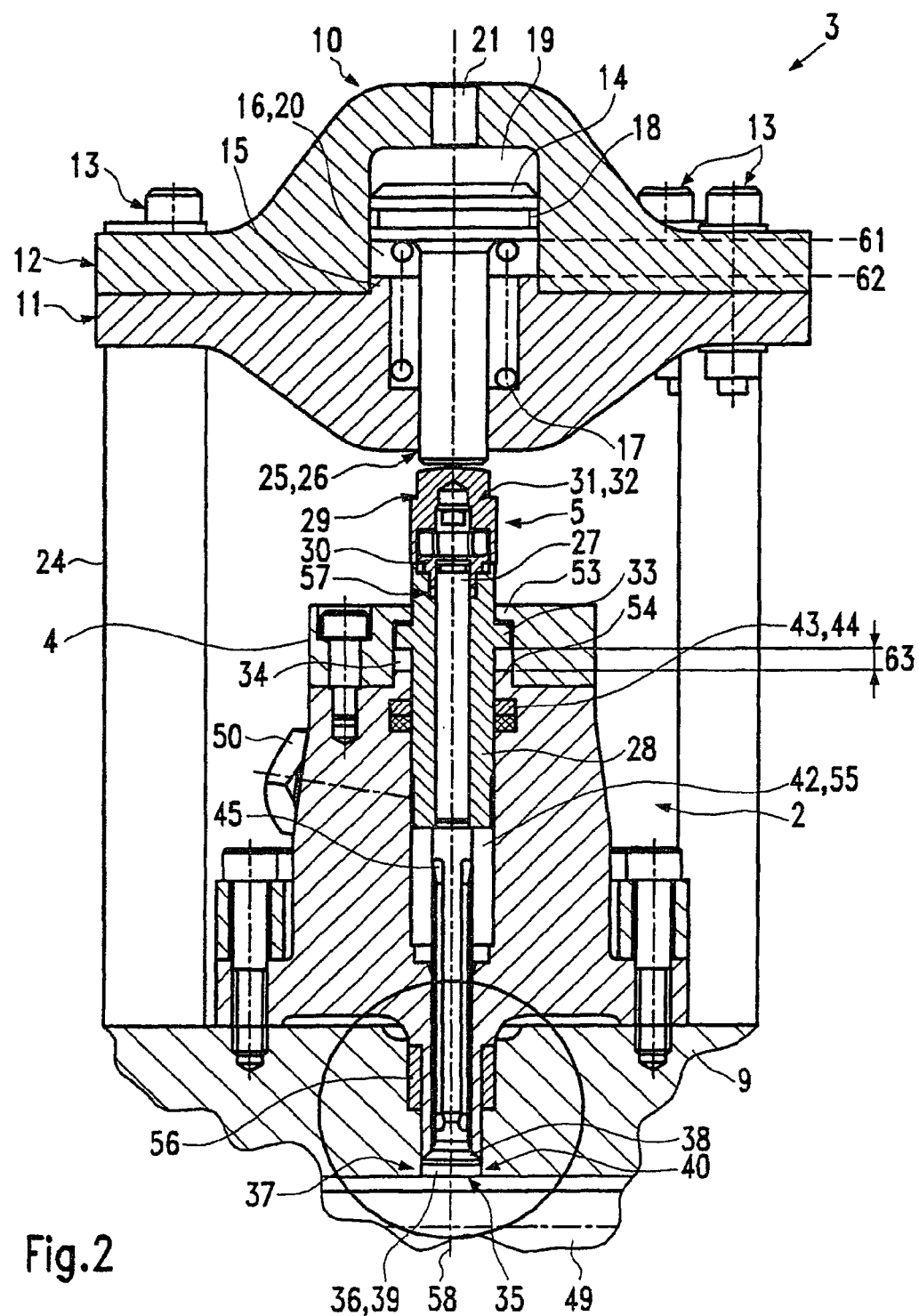
FIG. 2 shows a sectional view through the inventive device of FIG. 1.

FIG. 2 shows a sectional view through the device 1 mounted on the ignition tube 9. The reference numbers used in FIG. 2 denote the same parts as in FIG. 1, so that the description of FIG. 1 is referred to in this respect. In the device 1 depicted in FIG. 2, the valve 2 is in an inactivated state and the activation mechanism 3 is in a rest position.

In this embodiment, the valve 2 of device 1 extends at least partially into the material of the ignition tube 9 and seals it relative thereto with a sealing element 56. The sealing element 56 is designed in a sleeve-like manner and is made from a low-sparking material. It is arranged between the valve housing 4 and ignition tube 9. Alternatively, the sealing element 56 can also have a different shape. For example, it can consist of one or more sealing rings or the like that are connected in series. In addition, in other embodiments of the invention, it can also consist of another material, for example, it can consist of a steel or another alloy suitable for this requirement.

The activating mechanism 3 of device 1 has a multipart housing 10 and an activating element, in this case a piston 14. In this embodiment, the housing 10 consists of a bottom 11 and a cover 12. The bottom 11 has a centering shoulder 15 to center the two housing parts 11 and 12 relative to each other, and is connected to cover 12 by means of screws 13. In the interior of the activating mechanism 3, a recess 16 is provided, in which the piston 14 can be arranged to move axially. Movement of the piston 14 is limited by the centering shoulder 15 of bottom 11 and by cover 12.

The piston 14 is biased by an elastic element 17 in the direction of cover 12. A sealing device 18 is arranged on piston 14. The sealing means 18 divides the recess 16 into an upper chamber 19 and a lower chamber 20. The upper chamber 19 can be filled with a fluid via a fluid connection 21, i.e. a gas or a liquid. In this embodiment, the fluid connection 21 is designed as a pressure connection and connected to a hydraulic system.

The activating mechanism 3 is arranged behind valve 2. The piston 14 protrudes with its lower end 25 through an opening 26 in the bottom 11 of the activating mechanism 3 and is arranged in series behind valve 2 or valve tappet 5 in an approximately axial extension thereof. In doing so, it is about 2 to 7 mm, preferably 3 to 6 mm, and more preferably 4 to 5 mm, spaced apart from valve 4 or valve tappet 5. In other embodiments of the invention, the piston 14 can also slightly touch the valve tappet 5, however. Furthermore, intermediate elements, such as a spring, which are arranged between piston 14 and valve tappet 5, are also conceivable.

The valve tappet 5 is constructed from several parts and, in this embodiment, consists of three elements, a middle piece 27, a wall area 28 and a cap 29. The middle piece 27, also referred to as a base piece, is provided with a thread 32 in its rear end 31 facing the activating mechanism 3. It extends through the edge area 28 and is fastened in it via a nut 30. A sealing means 57, in this case a sealing ring 57, is provided between edge area 28 and middle piece 27. This seals the interface between the two elements 27 and 28 of the valve tappet 5 against fluid escape. The sealing device 57 can be biased via nut 30. In a further embodiment of the invention, the nut 30 can also simultaneously serve as an adjustment means, via which the axial position of the middle piece 27 can be adjusted relative to the edge area 28. The cap 29 is also screwed onto thread 32. It serves for protection of the underlying adjustment mechanism with nut 30 and forms the closure of valve tappet 5 on the side of the activating mechanism.

The edge area 28 of valve tappet 5 has a shoulder 33 that engages with a movement space 34 in valve housing 4. Movement of the valve tappet 5 in the axial direction is limited by the walls 53, 54 of the movement space 34. The movement space 34, together with valve tappet 5 and the valve seat 37 described below, define the valve stroke 63.

The middle piece 27 has a valve head 36 on its front end 35 on the ignition tube side, which is sealed against the valve seat 37. The valve head 36 and the valve seat 37 are shaped approximately corresponding. The valve seat 37 is designed approximately like a conical seat in this case and the valve head 36 has a conical sealing surface 38. On the outflow side, i.e. on its side facing ignition chamber 49, the valve head 36 has an approximately cylindrical area 39, which is arranged approximately concentric in a correspondingly shaped area 40 of cone seat 37. The cylindrical area 39 of valve head 36 and the cylindrical area 40 of valve seat 37 are spaced apart from each other, and form an annular gap 41 if the valve is inactivated. This is shown enlarged in FIG. 3.

The valve tappet 5 comprises at least partially a low-sparking material. In this embodiment, the middle piece 27 of valve tappet 5 is made from a low-sparking material. Alternatively, depending on the application, only certain areas of the valve tappet, such as the valve head 36 or sealing surface 38, comprise this alloy.

The valve housing 4 has a pressure chamber 42, which, in this embodiment, is formed by the opening 55 in valve housing 4 and the edge area 28, as well as middle piece 27. The housing 4 has at least one sealing means 43 that seals the housing 4 with respect to the edge area 28 of valve tappet 5. In this embodiment, the sealing means 43 is provided in the form of two sealing rings 44. Together with the valve head 36 and the valve seat 37, these seal the pressure chamber 42 with respect to fluid escape.

The pressure chamber 42 has at least one fluid connection 50, via which it can be filled with a fluid, for example, an explosive gas or gas mixture. The pressure chamber 42 of the embodiment considered here has two fluid connections 50, 51, one for oxygen ($O_2$) and one for hydrogen ($H_2$).

The middle piece 27 of valve tappet 5 has longitudinal grooves 45 that extend from the pressure chamber 42 in the direction of valve head 36. The longitudinal grooves 45, in this embodiment, extend continuously and approximately axially along middle piece 27. In other embodiments of the invention, the continuation and shape of the grooves 45, however, can vary. Grooves 45, for example, can also proceed in a slight coil form or be interrupted, etc. Alternatively, the longitudinal grooves 45 can also be replaced by corresponding bores in middle piece 27.

Figure 3:
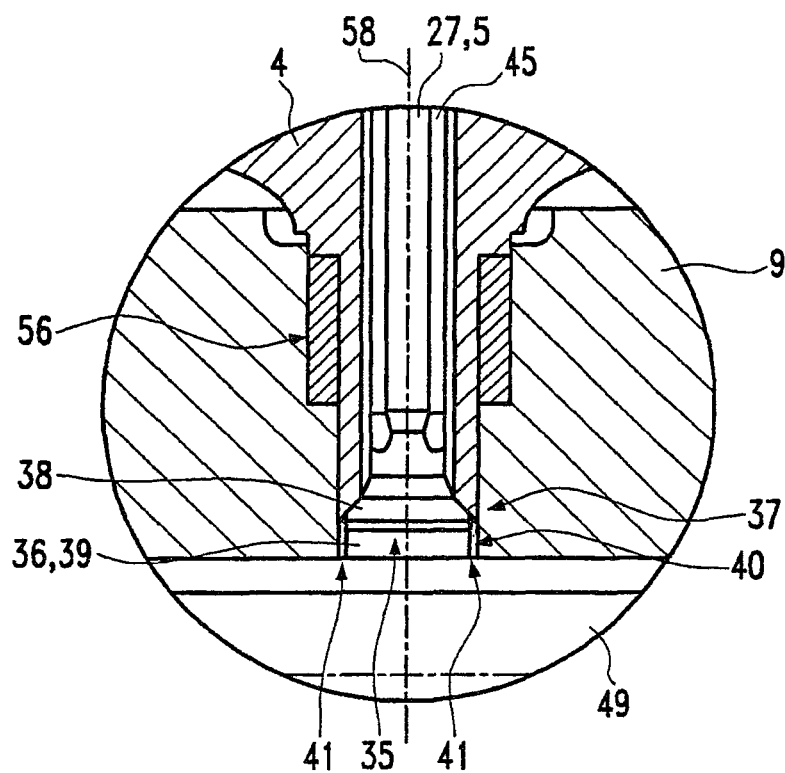
FIG. 3 shows a detail enlargement of the valve head of the inventive device.

FIG. 3 shows a detailed enlarged view of the valve head 36 of the device 1 according to the invention. The reference numbers used in FIG. 3 denote the same parts as in FIGS. 1 and 2, so that the description of FIGS. 1 and 2 is referred to in this respect.

The particular shape of the valve head 36 and the correspondingly shaped valve seat 37 are readily recognizable in FIG. 3. The approximately parallel continuation of the two cylindrical areas 39 and 40 is also readily apparent here. It is recognizable in the enlargement that the valve seat 37 in this embodiment of the invention is multipart. The conical area of valve seat 37 is arranged here in the valve housing 4, while the cylindrical area 40 of valve seat 37 is formed in the ignition tube 9.

In the embodiment of the invention described here, the moving valve element 5 is a valve tappet and the activating element 14 is a piston. However, this need not necessarily be the case. In other embodiments of the invention, the configuration of these elements 5, 14 can also deviate from that described here. For example, a membrane, a sphere or the like can also be provided as valve element 5 and/or activating element 14.

The mode of operation of the embodiment according to the invention depicted in FIGS. 1 to 3 is explained below.

In the inactivated valve state depicted in FIG. 2, the activating mechanism 3 of the device 1 is arranged separate from valve 2. It is situated in a rest position 61 and largely decoupled from valve 2. In the embodiment of the invention considered here, the activating mechanism 3 and piston 14 are spaced apart from valve 2 and valve tappet 5. In this state, the valve head 36 is sealed in conical seat 37. A fluid exchange, for example, a gas exchange between pressure chamber 42 and ignition chamber 49 in the ignition tube 9, is interrupted.

Corresponding fluid lines are connected to the fluid connections 50, 51 of pressure chamber 42. In this embodiment, hydrogen ($H_2$) is introduced via fluid connection 50 and oxygen ($O_2$) via fluid connection 51 in a specific ratio. An explosive gas mixture, oxyhydrogen gas, is formed in pressure chamber 42 on this account.

Alternatively, the oxyhydrogen gas, however, can also only be generated in the die. For this purpose, hydrogen ($H_2$) is initially introduced via fluid connection 50 and released in metered fashion into ignition tube 9 via the valve, as described below. Subsequently, oxygen ($O_2$) is introduced to the pressure chamber via fluid connection 51, and also released into the die in metered fashion. Oxyhydrogen gas is formed in ignition tube 9 on this account.

Depending on the application, filling of the valve with the different gases, as described above, can occur in succession, or also simultaneously. By simultaneous introduction of the gas or gas mixture through several fluid connections 50, 51, the filling process and therefore the setup time of the die can be shortened. By simultaneous introduction of different gases, such as $H_2$ and $O_2$, through different fluid connections 50, 51, a gas mixture, such as oxyhydrogen gas, can be generated in the valve, which can then be released in a metered fashion into the work piece.

According to the application, the pressure connections 50, 51 can be utilized differently. It is also possible to introduce several gases through a pressure connection into the valve. In the present embodiment, for example, both gases $H_2$ and $O_2$ or a prepared oxyhydrogen gas mixture can be introduced via fluid connection 50 or fluid connection 51. A protective gas, like argon, nitrogen, etc., or a liquid, such as water, can be introduced via the second fluid connection 51. Thus, the hazard potential for the environment existing during handling of hydrogen ($H_2$) can be reduced.

In order to activate valve 2 and produce a fluid connection between pressure chamber 42 and ignition chamber 49, the piston 14 of the activating mechanism 3 is exposed to pressure via the fluid connection 21 in cover 12. For this purpose, a fluid, in this embodiment hydraulic oil, is introduced to the upper chamber 19. Because of the pressure that builds up in the upper chamber 19, the piston 14 is displaced against the spring force of elastic element 17 in the direction of valve 2 into a working position 62. The lower end 25 of piston 14 then comes in contact with valve 2 and activates it.

During the activation process, the valve tappet 5 is forced by piston 14 in the direction of ignition tube 9. The shoulder 33 of the edge area 28 is moved axially in the movement space 34, until it touches the wall 54 of movement space 34. At the same time, the valve head 36 is separated from valve seat 37. The valve 2 is now in an opened state and the pressure chamber 42 is in fluid connection with ignition chamber 49 of ignition tube 9. Depending on the prevailing pressure conditions in pressure chamber 42 and ignition chamber 49, oxyhydrogen gas now flows into the ignition chamber 49 and is accumulating therein. The oxyhydrogen gas then flows around the valve tappet 5. It flows along the middle piece 27 of valve tappet 5 in the direction of valve head 36. The gas flow is then diverted through longitudinal grooves 45.

If the fluid connection 21 in the cover 12 of activating mechanism 3 is unloaded, i.e., the fluid pressure in the upper chamber 19 is reduced, the piston 14 is forced by the spring force of elastic element 17 back into its rest position 61 in the direction of fluid connection 21. Because of the fluid pressure in chamber 42, 5, the valve tappet 5 is moved in the direction of activating mechanism 3 and the valve 2 therefore forced into an inactivated or closed state. The shoulder 33 in the movement space 34 is also moved with valve tappet 5 in the direction of activating mechanism 3. Before shoulder 33 comes in contact with wall 53 of movement space 34, the valve head 36 stops on the conical surface of valve seat 37 and thus closes valve 2. Thereby, the fluid connection of pressure chamber 42 with ignition chamber 49 is interrupted. The valve 2 is now back again in an inactivated state.

During this closure process, i.e., while the piston 14 and valve tappet 5 are moving, mechanical decoupling of the activating mechanism 3 and valve 2 occurs. The time of decoupling is dependent on several factors, especially the pressure conditions in upper chamber 19, pressure chamber 42, ignition chamber 49 and the spring force of the elastic element 17.

If the closing time or stroke 63 of valve 2 is not right, it can be adjusted via nut 30. By opening the cap 29 and rotating nut 30 clockwise or counterclockwise, the axial position of the middle piece 27 relative to edge area 28 can be adjusted. The valve tappet 5 can thus be lengthened or shortened.

After the ignition tube 9 of the explosive forming die 8 has been filled as described above with the explosive gas mixture, in this case oxyhydrogen gas, this can be ignited. During explosion of the oxyhydrogen gas, the volume of the gas is increased and therefore the pressure in the interior of ignition tube 9 is increased abruptly. A detonation front is formed, which moves in this embodiment at high velocity along the ignition chamber 49 in the interior of ignition tube 9. Because of the particular shape of valve head 36 and the low weight of valve tappet 5, the valve 2 is forced into an inactivated, i.e., closed state, during the abruptly occurring pressure load in ignition tube 9. The low weight of valve tappet 5 then promotes a rapid reaction of the valve to dynamic loading and the particular form of the valve head 36 and/or valve seat 37 guarantees a good sealing even during abruptly occurring high pressure fluctuations.

The safety of the valve during the explosion can be further increased by filling the pressure chamber 42 after introduction of the explosive gas or gas mixture in the ignition tube 9 with a non-explosive fluid, such as a protective gas, or a liquid, such as water. The protective gas can be fed into pressure chamber 42 of the valve via one or both fluid connections 50, 51, so that the valve tappet 5 is forced in the direction of activating mechanism 3 and the valve therefore forced into an inactivated state.

Although the inactivated valve state in this embodiment of the invention corresponds to a closed valve state, in other embodiments of the invention, depending on the application, the behavior can be precisely reversed. For example, the inactivated valve state can also correspond to an opened valve.

FIGS. 4 to 7 show a second embodiment of the device 1 according to the invention for fluid feed for explosive forming.

The design of the second embodiment is similar to that of the first embodiment. Only the differences in the two embodiments are therefore outlined below. If the same components or components equivalent in function are involved in FIGS. 4 to 8 of the second embodiment, the same reference numbers as in FIGS. 1 to 3 of the first embodiment are used, so that the description of FIGS. 1 to 3 is referred to in this respect.

In FIGS. 4 to 7, the activating mechanism 3 was left out for reasons of clarity. It is arranged in this embodiment similarly to the first embodiment behind valve 2 of device 1, as shown, for example, in FIG. 2 of the first embodiment. As an alternative to the design operated with a fluid, as depicted in the first embodiment, the activating mechanism 3 can also be operated electrically. In the electrically operated design, an electromagnet that interacts with a magnetic activating element 14 can be provided, for example, instead of fluid connection 21.

Figure 4:
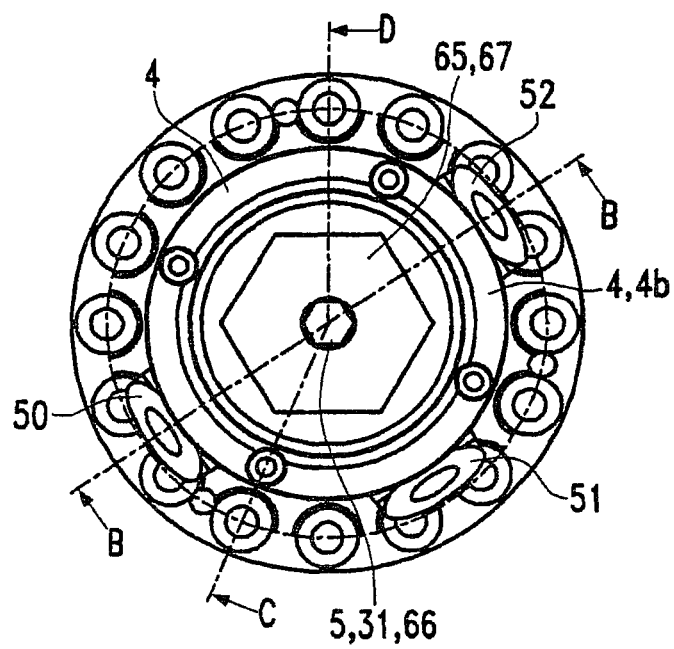
FIG. 4 shows a top view of a second embodiment of the device according to the invention.

FIG. 4 shows a top view of the valve 2 of the second embodiment of the invention. Because of the missing activating mechanism 3, a view to the rear end 6 of valve housing 4, as well as the rear end 31 of valve element 5, is unobstructed. The valve element 5 is also designed in the form of a valve tappet in this embodiment of the invention.

Figure 5:
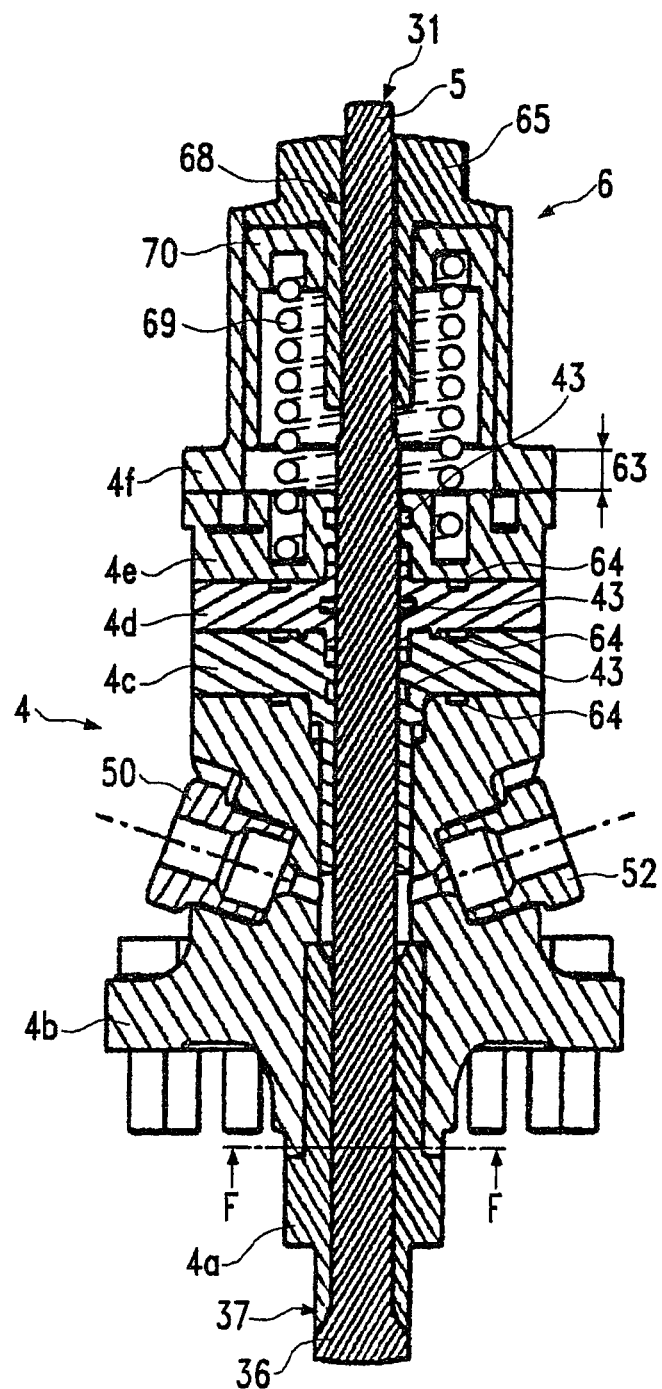
FIG. 5 shows a section through the device according to the invention from FIG. 4 along line B-B.

It is readily apparent in the top view that the valve 2 of the second embodiment of the invention has three connections 50, 51, 52, which are connected to the pressure chamber 42 in the interior of valve 2, as shown in FIG. 5. The first two connections 50, 51 are used similar to the first embodiment as fluid connections, whereas a measurement instrument, for example, for internal pressure measurement in pressure chamber 42, can be introduced via the third connection 52.

Alternatively, the connection 52 can also be designed as a fluid connection, in order to permit either a more rapid filling of pressure chamber 42 or to permit the supply of a third fluid, such as an inert gas. In other embodiments of the invention, more than three such connections to valve 2 can therefore also be provided, which permit access to pressure chamber 42.

FIG. 5 shows a sectional view through valve 2 of the second embodiment of the invention along intersecting line B-B in FIG. 4.

Here again, the valve housing 4 is in several parts, similar to the first embodiment. It has individual segments 4a to 4f. Seals 64 that seal the individual segments 4b to 4e relative to each other are provided between the individual segments 4b to 4e of the valve housing. In this embodiment, individual segments 4c to 4e in the valve housing 4 are also sealed relative to valve element 5. The segments 4b to 4e are sealed relative to valve element 5 by sealing means 43, and the valve segment 4a is sealed relative to valve element 5 by means of valve seat 37. This increases the safety against leakage. In other embodiments of the invention, however, correspondingly fewer seals 43 can be provided. Each individual element 4a to 4e need not necessarily be sealed relevant to valve element 5.

The pressure chamber 42, through which the valve element 5 extends, is formed in the valve housing 4 in this second embodiment. This means, in contrast to the first embodiment, it is only formed by non-moving segments 4a-c of the valve housing 4.

The valve element 5 in this embodiment is designed essentially in one part. Only on its rear end 31 is a flange 65 applied to the valve element 5. In this case, both the valve element 5 and flange 65 have a width across flats 66 and 67 and are directly screwed to each other via thread 68. Alternatively, the flange 65, however, can also be connected to the valve element 5 in different ways known to one skilled in the art, for example, by screwing with separate screws or the like.

The valve 2 is kept closed via flange 65 and an elastic element 69 provided in valve housing 4. This means the valve head 36 of valve element 5 is kept in contact with the valve seat 37 of valve housing 4 via the spring force of elastic element 69. In this case, the elastic element 69 is a torsion spring arranged via a spacer sleeve 70 between valve housing 4 and flange 65. The spacer sleeve 70 thus limits the spring path and therefore movement of the flange 65 and valve element 5.

The valve seat 37 in this embodiment of the invention is formed in a separate segment 4a of valve housing 4. The valve seat 37 or the entire segment 4a can thus be especially adapted to the requirements in this thermally and mechanically stressed area and be made, for example, from a different material than the rest of valve housing 4, for example, from a low-sparking material. In addition, this segment 4a of valve housing 4 can be easily replaced during any damage, without having to replace the entire valve housing.

Figure 6:
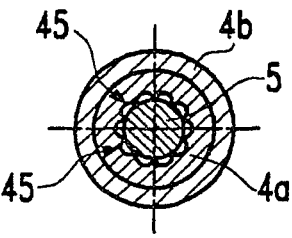
FIG. 6 shows a sectional view through the device according to the invention along line F-F in FIG. 5.

The longitudinal grooves 45 that extend from pressure chamber 42 in the direction of valve head 36 are not arranged in this embodiment of the invention as in the first embodiment in valve element 5, but in the valve housing 4 enclosing it, as is apparent in FIG. 6.

FIG. 6 shows a sectional view through the valve housing 4 in the area of segment 4a along intersecting line F-F in FIG. 5. It is apparent here that the surface of valve tappet 5 is largely smooth, whereas the longitudinal grooves 45 are formed in segment 4a of valve housing 4. As an alternative to the first and second embodiment of the invention, the longitudinal grooves or parts of them can also be provided in both components, i.e., in the valve element 5 and valve housing 4. Alternatively, valve element 5 and valve housing 4 can also have any other contours, whose interaction produces channels suitable for guiding fluid from pressure chamber 42 in the direction of valve head 36.

Figure 7:
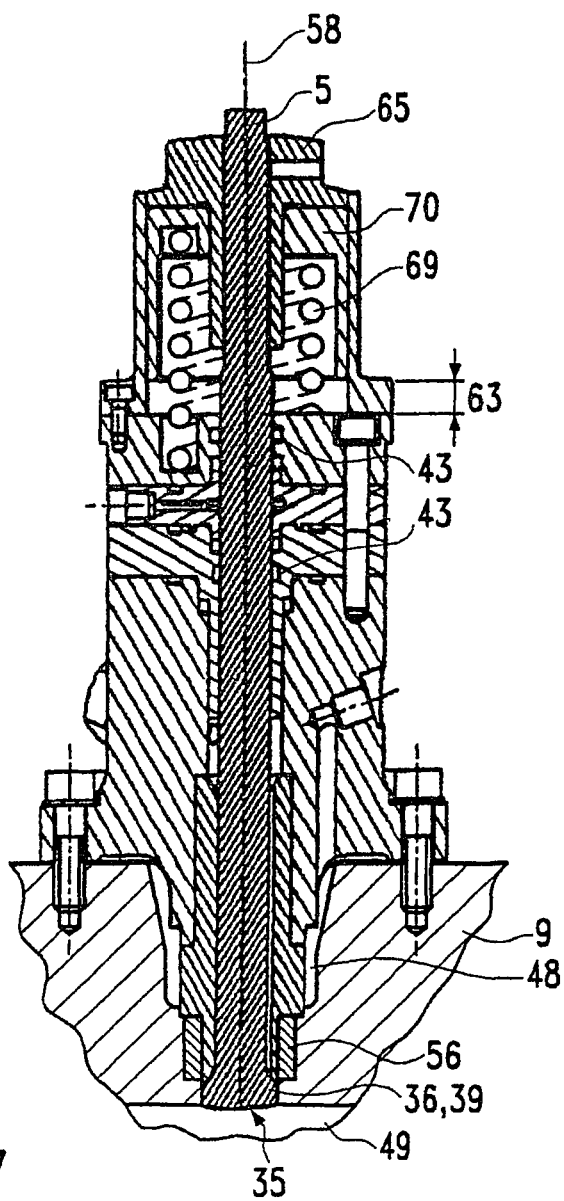
FIG. 7 shows a sectional view through the device according to the invention along line D-C in FIG. 4.

FIG. 7 shows a sectional view through the valve 2 of the second embodiment of the invention along intersecting line D-C in FIG. 4 in a state installed on ignition tube 9.

It is apparent here that valve 2, according to the second embodiment of the invention, is arranged with a seal 56, which preferably consists of a low-sparking material, in the ignition tube 9 or on a corresponding part of the forming die 8.

The mode of operation of the second embodiment of the invention depicted in FIGS. 4 to 7 is explained below. This is very similar to the mode of operation of the first embodiment. Therefore, only the differences in function are outlined here.

The two fluid connections 50, 51 are used similarly to the first embodiment. Via the third connection 52, an internal pressure measurement instrument is introduced to the pressure chamber 42 in the second embodiment of the invention. Measured values can be determined with it at certain critical times, for example, during filling of pressure chamber 42 or during the explosion, in order to be able to counteract an overloading of the valve. Alternatively, permanent measured values can also be generated and thus, a pressure curve can be recorded for the forming cycle.

The activating mechanism 3, similar to the first embodiment, is also arranged separate relative to valve 2 in the second embodiment of the invention. It only comes in contact with valve element 5 through electric, pneumatic, or hydraulic activation and moves it against the force of elastic element 69 into an activated, i.e., opened, valve state. In this state, the valve head 36 is spaced apart from valve seat 37. The fluid can thus move from pressure chamber 42 along valve element 5 and longitudinal grooves 45 into the explosive forming die 8, more precisely into ignition chamber 49 of ignition tube 9.

Movement of the valve element 5 into the opened valve state is thereby limited by the spacer sleeve 70. This sleeve is moved with the valve element 5 via the flange 65 mounted on the valve element 5 and thus defines the stroke 63 of valve 2. By incorporation of spacer sleeves of different shapes and dimensions, the valve stroke 63 can be adjusted simply and quickly.

The valve stroke 63 is also adjustable, to a certain degree, via positioning of flange 65 on valve element 5. If, as in this case, a direct screw connection of the two parts with each other is provided, the valve stroke 63 can be adjusted in the already mounted valve by simple rotation of flange 65 relative to valve element 5, without disassembling or removing the valve. The bias of elastic element 69, and therefore the closure force of valve 2, can also be regulated simply via this mechanism.

If the filling process of ignition tube 9 with the explosive fluid or fluid mixture is completed, the activating mechanism 3 is also reset electrically, pneumatically or hydraulically to its rest position 61 and the valve element 5 unloaded. Because of the spring force of elastic element 69, the valve element 5 is forced into a closed, inactivated valve state. In this state, the valve head 36 also seals valve seat 37 and thus interrupts the fluid connection between ignition chamber 49 and pressure chamber 42.

The invention claimed is:

1. A device for fluid feed for explosive forming comprising:

an ignition element of an explosive forming die, said ignition element including an ignition chamber;

a valve having a valve housing and a valve element which is moveable and at least partially disposed in said valve housing and wherein said valve is coupled to said ignition element; and an activating mechanism having an activating housing and an activating element at least partially disposed in said activating housing and extending to a lower end for engaging and activating said valve element, wherein said activating mechanism in an inactivated valve state is provided separately relative to said valve and said activating mechanism including said activating housing and said activating element does not contact said valve, including said valve housing and said valve element and wherein during the activation process, only said activating element of said activating mechanism contacts said valve and wherein said activating mechanism is separately coupled to said ignition element from said valve, such that in said inactivated state said activating mechanism including said activating housing and said activating element does not contact said valve housing;

said activating housing extending along a center axis and defining a recess, said activating housing including a fluid connection opening extending from outside of said activating housing to said recess, and said activating housing defining a second opening extending from said recess along said center axis to outside of said activating housing and toward said valve;

said activating element being axially movable in said recess between said fluid connection opening and said second opening, said activating element including a sealing device dividing said recess into an upper chamber and a lower chamber, and said activating element being biased toward said fluid connection opening when said device is in said inactivated state;

said valve housing defining a valve opening extending along said center axis and continuously from a first end of said valve housing to a second end of said valve housing, said valve opening being in fluid communication with said ignition chamber at said second end of said valve housing, said valve housing including a wall surrounding at least a portion of said center axis and facing toward said valve element;

said valve element being disposed in said valve opening and extending longitudinally along said center axis, said valve element including a shoulder facing said wall of said valve housing and being biased into engagement with said wall when said device is in said inactivated state, said valve element and said valve housing defining a pressure chamber therebetween, said pressure chamber being sealed from said ignition chamber when said device is in said inactivated state, and said pressure chamber being in fluid communication with said ignition chamber when said device is in an activated state.

2. A device according to claim 1, wherein said activating mechanism and said valve in the inactivated valve state are spaced apart relative to each other.

3. A device according to claim 2, wherein a spacing between said activating mechanism and said valve is 2 to 7 mm.

4. A device according to claim 2, wherein said activating mechanism is held in a rest position by an elastic element, and said valve is in the inactivated state in said rest position.

5. A device according to claim 2, wherein said activating mechanism can be brought into a working position by exposure to pressure with a fluid, and said valve is in said activated state in said working position.

6. A device according to claim 2, wherein said activating mechanism can be brought into a working position by electrical energy, and said valve is in said activated state in said working position.

7. A device according to claim 2, wherein said pressure chamber is fillable with a fluid, and said device includes at least two fluid connections to said pressure chamber.

8. A device according to claim 7, wherein said pressure chamber comprises an additional connection, via which at least one of a fluid and a measuring instrument can be introduced into said pressure chamber.

9. A device according to claim 1, wherein said valve housing of said valve is multipart.

10. A device according to claim 9, wherein a valve seat provided in said valve housing is provided in a separate segment of said valve housing.

11. A device according to claim 9, wherein said valve element is at least partially surrounded by a fluid during the fluid feed.

12. A device according to claim 9, wherein said valve element comprises longitudinal grooves that extend from said pressure chamber in the direction of a valve head of a valve tappet.

13. A device according to claim 9, wherein said valve housing comprises longitudinal grooves that extend from said pressure chamber in the direction of a valve head of said valve element.

14. A device according to claim 9, wherein a valve head of said valve element comprises said shoulder and has a conical sealing surface and a substantially cylindrical area on an outflow side corresponding to the shape of said wall of said valve housing.

15. A device according to claim 9, wherein said valve element comprises a base piece having a valve head and an edge area, in which the axial position of said base piece relative to said edge area is adjustable by an adjustment means.

16. A device according to claim 9, wherein said valve element is formed integrally.

17. A device according to claim 9, wherein said shoulder can be moved in a movement space that limits the axial movement of said valve element in said valve housing.

18. A device according to claim 9, wherein said valve element is forced by means of an elastic element into a position, in which said valve is in the closed state.

19. A device according to claim 1, wherein a seal made of a low-sparking material is provided between said valve and said ignition element of an explosive forming die that accommodates said valve.

20. A device according to claim 1, wherein said valve element comprises a low-sparking material.

21. The device according to claim 1, wherein said ignition element is an ignition tube and wherein each of said valve housing and activating mechanism housing are coupled to said ignition tube.

22. A device for fluid feed for explosive forming attached to an ignition tube of a die, the device comprising:
a valve coupled to the ignition tube, said valve having a valve element axially moveable in a valve housing;
an activating mechanism having an activating housing coupled to said ignition tube and wherein in an inactivated valve state, said activating mechanism is separate from and does not contact said valve, said activating mechanism including said activating housing and said valve housing being spaced apart and wherein said activating mechanism includes an activating element axially aligned with said valve element;
said activating housing extending along a center axis and defining a recess, said activating housing including a fluid connection opening extending from outside of said activating housing to said recess, and said activating housing defining a second opening extending from said recess along said center axis to outside of said activating housing and toward said valve;
said activating element being axially movable in said recess between said fluid connection opening and said second opening, said activating element including a sealing device dividing said recess into an upper chamber and a lower chamber, and said activating element being biased toward said fluid connection opening when said device is in said inactivated state;
said valve housing defining a valve opening extending along said center axis and continuously from a first end of said valve housing to a second end of said valve housing, said valve opening being in fluid communication with said ignition tube at said second end of said valve housing, said valve housing including a wall surrounding at least a portion of said center axis and facing toward said valve element;
said valve element being disposed in said valve opening and extending longitudinally along said center axis, said valve element including a shoulder facing said wall of said valve housing and being biased into engagement with said wall when said device is in said inactivated state, said valve element and said valve housing defining a pressure chamber therebetween, said pressure chamber being sealed from said ignition tube when said device is in said inactivated state, and said pressure chamber being in fluid communication with said ignition tube when said device is in an activated state.

23. The device according to claim 22, wherein during said activation process only said activating element of said activating mechanism contacts said valve element.

24. A device for fluid feed for explosive forming attached to an ignition tube of a die, the device comprising:
a valve coupled to the ignition tube, said valve having a valve element moveable in a valve housing;
an activating mechanism coupled to said ignition tube and wherein in an inactivated valve state, said activating mechanism is separate from and does not contact said valve and wherein said activating mechanism includes an activating housing and an activating element at least partially disposed therein and wherein only said activating element of said activating mechanism is capable of contacting said valve element to axially displace said valve element, in an activated state;

said activating housing extending along a center axis and defining a recess, said activating housing including a fluid connection opening extending from outside of said activating housing to said recess, and said activating housing defining a second opening extending from said recess along said center axis to outside of said activating housing and toward said valve;

said activating element being axially movable in said recess between said fluid connection opening and said second opening, said activating element including a sealing device dividing said recess into an upper chamber and a lower chamber, and said activating element being biased toward said fluid connection opening when said device is in said inactivated state;

said valve housing defining a valve opening extending along said center axis and continuously from a first end of said valve housing to a second end of said valve housing, said valve opening being in fluid communication with said ignition tube at said second end of said valve housing, said valve housing including a wall surrounding at least a portion of said center axis and facing toward said valve element;

said valve element being disposed in said valve opening and extending longitudinally along said center axis, said valve element including a shoulder facing said wall of said valve housing and being biased into engagement with said wall when said device is in said inactivated state, said valve element and said valve housing defining a pressure chamber therebetween, said pressure chamber being sealed from said ignition tube when said device is in said inactivated state, and said pressure chamber being in fluid communication with said ignition tube when said device is in said activated state.

25. The device according to claim 24, wherein said activating housing is coupled to said ignition tube and is spaced from said valve housing and said valve element in said inactivated state and during said activation process.

26. The device according to claim 25, wherein said activating housing is coupled to said ignition tube in said inactivated state.

27. A device for fluid feed for explosive forming comprising:
an ignition tube;
a valve including a valve housing and a valve element and wherein said valve housing is coupled to said ignition tube; and
an activating mechanism having an activating housing and an activating element at least partially disposed therein and wherein said activating housing is coupled to said ignition tube, and wherein in an inactivated state, said activating mechanism, including said activating housing, is separate from and does not contact said valve including the valve housing, and wherein in an activated state only said activating element of said activating mechanism contacts said valve element:

said activating housing extending along a center axis and defining a recess, said activating housing including a fluid connection opening extending from outside of said activating housing to said recess, and said activating housing defining a second opening extending from said recess along said center axis to outside of said activating housing and toward said valve;

said activating element being axially movable in said recess between said fluid connection opening and said second opening, said activating element including a sealing device dividing said recess into an upper chamber and a lower chamber, and said activating element being biased toward said fluid connection opening when said device is in said inactivated state;

said valve housing defining a valve opening extending along said center axis and continuously from a first end of said valve housing to a second end of said valve housing, said valve opening being in fluid communication with said ignition tube at said second end of said valve housing, said valve housing including a wall surrounding at least a portion of said center axis and facing toward said valve element;

said valve element being disposed in said valve opening and extending longitudinally along said center axis, said valve element including a shoulder facing said wall of said valve housing and being biased into engagement with said wall when said device is in said inactivated state, said valve element and said valve housing defining a pressure chamber therebetween, said pressure chamber being sealed from said ignition tube when said device is in said inactivated state, and said pressure chamber being in fluid communication with said ignition tube when said device is in said activated state.

* * * * *